United States Patent Office 3,205,941
Patented Sept. 14, 1965

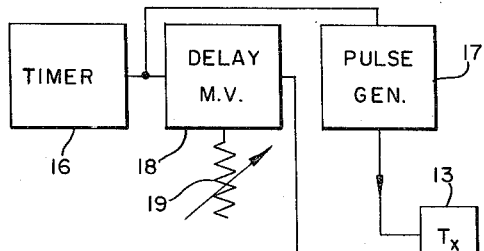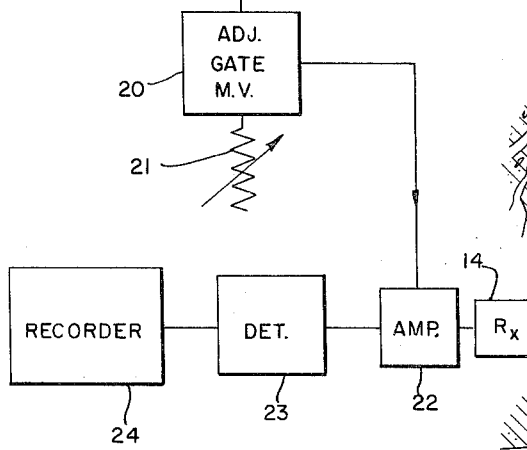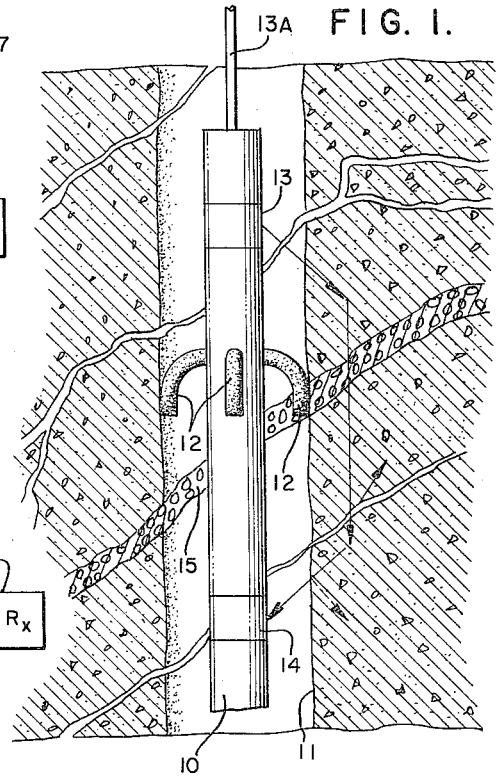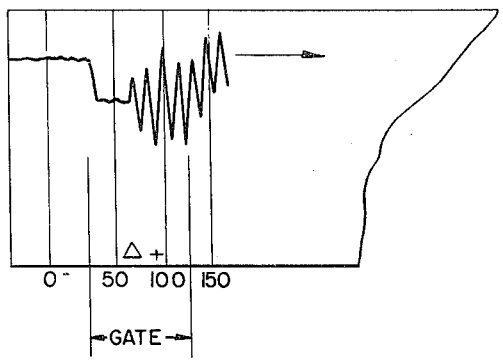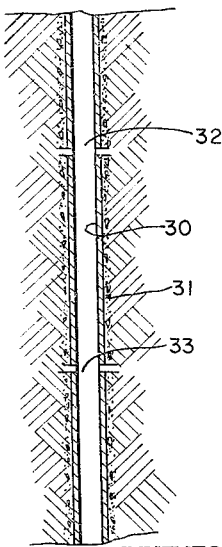

3,205,941
TECHNIQUES USEFUL IN DETERMINING FRACTURES OR DENSITY DISCONTINUITIES IN FORMATIONS
Terry Walker, Houston, Tex., assignor to Halliburton Company, Duncan, Okla., a corporation of Delaware
Filed June 15, 1962, Ser. No. 202,764
9 Claims. (Cl. 166—4)

The present invention relates to means and techniques particularly useful in locating regions of discontinuities such as fractures in formations that surround a bore hole, as well as other characteristics of such formations.

The invention has general utility in different kinds of formations. For example, in formations of relatively low porosity and permeability, the productivity of an oil well depends to a great extent upon naturally occurring fractures. These fractures may or may not be present and, when present, are usually randomly distributed throughout the formation. Therefore, the location of the most heavily fractured interval and a quantitative measurement of the relative degree of fracturing is important in establishing the best completion interval in such formations.

In the travel of an acoustic signal through a formation around a well bore, the amplitude of the signal reaching a receiver depends upon the type of formation, distance traveled, number of density interfaces crossed and, to a certain extent, the fluid content in the pore spaces. Any fractures in the path of a transmitted acoustic signal results in a sharp discontinuity or sharp density change at the interfaces (solid to liquid or gas to solid) at which a large reflection of energy occurs. Therefore, the signal amplitude reaching a receiver that receives transmitted acoustic energy through such path depends upon the number and nature of such fractures. Even when the fracture or fractures extend generally parallel to the path of the signal, a reduced amplitude results because of reflections and resulting destructive interference of oncoming waves of acoustic energy. Thus, fractured formations are located by measurement or indication or recording of the peak amplitudes of the received signal from a pulsed transmitter during a particular time after transmission of an acoustic pulse, the same being accomplished on a recurrent basis as described herein and so as to exclude signals that are transmitted through fluid in the bore hole.

Also, in accordance with other features of the present invention, the measurements, indications or recordings produced are correlated with other information and data relative to the general changes in lithology as they generally affect signal amplitude. Techniques of the inventions may be utilized to detect sharp variations in lithology which occur with localized departures from the average productive permeability within a zone of given lithology.

The amplitude measurements, if desired, may be correlated with preliminary test data taken in known homogeneous materials, which are those encountered in formations, and may thus be expressed in the form of a ratio that expresses the degree of fracture or discontinuity in the actual formation.

While the present invention is particularly useful in uncased bore holes, the same is applicable also to cased and cemented bore holes when there is a good bond between, on the one hand, the steel casing and cement and, on the other hand, the cement and formations.

It is therefore an object of the present invention to provide means and techniques for establishing more accurately the nature of formations.

A specific object of the present invention is to provide means and techniques for locating fractures in formations and, in particular, the best fractured interval in such formations.

Another specific object of the present invention is to provide improved means and techniques particularly useful is establishing the best fractured interval in hard rock formations.

Another specific object of the present invention is to provide means and techniques whereby information obtained thereby may be correlated with other information regarding lithology of the formations whereby the nature of such formations may be more accurately determined.

Another specific object of the present invention is to provide means and techniques whereby the degree of fracture or discontinuity in a formation may be expressed universally, for comparison purposes, in comparing fractures and discontinuities in various kinds of formations.

Another specific object of the present invention is to provide means and techniques whereby a cased bore hole is perforated at an optimum region or regions.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates apparatus useful in the practice of the present invention.

FIGURE 2 illustrates the electrical connections to the transmitting and receiving crystals.

FIGURE 3 illustrates the nature of the time varying received signal in FIGURE 1 and also indicates the range in which such signal is gated.

FIGURE 4 illustrates a cased bore hole which is perforated at locations established in accordance with features of the present invention.

The apparatus shown in FIGURE 1 includes a logging tool 10 traversable through the uncased bore hole 11 within which the tool is desirably centrally located. Spaced conventional rubber stand-off fingers 12 may be employed to centralize the tool within the bore hole which are large as compared with the O.D. of the tool. Although only one set of fingers 12 is illustrated, it is understood that the tool may include one or more additional sets of longitudinally spaced fingers as desired.

The tool 10 is powered by A.C. power currents supplied over logging line 13A which may also convey the detected logging signal for recording of the same at the surface. Also recorded in conventional manner is the particular location of the logging tool in the bore hole for reference purposes whereby the logging signal is correlated with respect to depth of the tool in the bore hole.

The logging tool includes a conventional transmitter crystal or transducer 13. The crystals are so mounted with respect to each other such that, in effect, a low pass mechanical filter is interposed between the same whereby energy, which is transmitted directly between the crystals in the tool, is of relatively small amplitude. Unwanted signals travelling in paths between the crystals other than along paths through the formations are gated out.

Apparatus for accomplishing such gating is shown generally in FIGURE 2 and more specifically in the copending application of Warren L. Anderson, Serial No. 202,886, filed on even date herewith, and assigned to the same assignee.

In FIGURE 2, pulses are applied to the transmitting crystal 13 which may have, for example, a nominal frequency of 18 kilocycles. For that purpose the pulses are initiated by timing means 16 which periodically causes firing of the pulse generator 17 connected to crystal 13.

The output of delay multivibrator 18 is applied to the adjustable gate multivibrator 20 having adjustable control 21 for developing a gate or enabling voltage that is applied to the amplifying means 22 for rendering the same effective to pass the signal received by transducer 14 within the range indicated at "GATE" in FIGURE 3.

The received signal thus passed through the amplifier is that signal which is developed from only that acoustic energy which passes through the formations and the same, after peak detection in detecting means 23, is recorded in recording means 24. The gating or enabling voltage may be adjusted both as the occurrence and duration and is adjusted to obtain a representative sample of that energy transmitted by transmitter crystal 13 exclusively through the formations to the receiving crystal 14. Such energy received by crystal 14 and recorded in recorder 24 is dependent upon the nature and condition of the formations and particularly so on whether the same conditions one or more fracture or density discontinuities therein. A fracture or density discontinuity in FIGURE 1 causes some of the energy to be reflected and, in some cases, refracted so that a portion of the otherwise transmittable energy to the receiving crystal never reaches the receiving crystal for recording purposes. Thus, there is a diminution in amplitude of the recording and such diminution serves as a measure of formation fracture or density discontinuity. Such discontinuity may be, as indicated at 15, in the nature of a thin gravel bed or unconsolidated streak or zone of localized character and is illustrative of another type of "fracture" and, in general, represents a structural variation detected in accordance with the present invention, which is applicable to the detection of localized departures from the average productive permeability within a formation zone.

Measurements or indications of energy thus gated and recorded are particularly useful in indicating fractures or density discontinuities when logging in known hard rock formations and also in any other formations where the lithology of such formations is known as, for example, from core samples obtained from the bore hole.

The degree of fracture or density discontinuity may be expressed as a ratio of the energy actually received in logging, as described above, to the energy received under like conditions in a known or test homogeneous formation of the same character, e.g. shale, lime, rock, sand, etc., and may be used interchangeably or universally in ascribing a particular fracture condition to all formations. Such ratio may be termed the fracture index for the formation without regard to the composition of the formation.

These techniques may be used in conjunction with the usual well completion steps of logging, setting casing, cementing and perforating, with the perforating of the well casing being at a location of maximum productive premeability as established by these techniques. Thus, FIGURE 4 illustrates a section of a conventionally cased and cemented bore hole, the casing being designated by the numeral 30 and the cement between the casing 30 and formations by the numeral 31, and in accordance with a feature of the invention, the cased hole is perforated at regions 32 and 33, such regions being determined or established by the means and techniques described above.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A method for determining the relative degree of structural variations in a formation traversed by a bore hole, the steps comprising transmitting recurrent pulses of acoustical energy, each of the same intensity, into said formation, measuring the amplitude of that energy which is transmitted and received through the formation to obtain a recording of the amplitude of said energy, transmitting recurrent pulses of acoustical energy, each of the same intensity, through a homogeneous formation of the same composition as said formation, measuring, under like conditions, the amplitude of acoustical energy so transmitted through said homogeneous formation, and comparing the first mentioned amplitude with the second mentioned amplitude to establish a degree of fracture of said formation.

2. A method as set forth in claim 1 including the steps of providing a casing in said bore hole and perforating said casing in a region established by said degree of fracture.

3. A method for determining the relative degree of structural variation in a formation traversed by a bore hole, the steps comprising ascertaining the composition of said formation, transmitting recurrent pulses of acoustical energy, each of the same intensity, through said formation, obtaining first measurements of the amplitude of acoustic energy so transmitted through said formation, transmitting recurrent pulses of acoustical energy, each of the same intensity, through a homogeneous formation of the same composition, obtaining second measurements under like conditions of the amplitude of acoustical energy so transmitted through said homogeneous formation, and comparing said amplitude obtained from said first measurements with the amplitude of acoustical energy transmitted through said homogeneous formation of the same composition to establish the degree of fracture of said formation.

4. A method for determining the interval of largest fracture in a formation of substantially the same composition traversed by a bore hole, the steps comprising, transmitting recurrent pulses of acoustical energy, each of the same intensity, through said formation, measuring the amplitude of acoustic energy so transmitted through said formation at different spaced regions in said formation, and selecting that region where said amplitude is of minimum value as being said interval of largest fracture.

5. In a method for comparing the degree of fracture in formations of different compositions surrounding a bore hole, transmitting recurrent pulses of acoustical energy, each of the same intensity, through a homogeneous body of each composition, measuring the amplitude of acoustic energy so transmitted through said homogeneous body of each composition, transmitting recurrent pulses of acoustical energy, each of the same intensity, through a formation of corresponding like composition, measuring under like conditions the amplitude of acoustic energy so transmitted through said formation of corresponding like composition, and expressing the first and second mentioned amplitudes as a ratio of the degree of fracture in said formations.

6. A method as set forth in claim 5 including the steps of providing a casing in said bore hole and perforating said casing in a region determined by said ratio.

7. A method for establishing the degree of fracture of a formation surrounding a bore hole, the steps comprising, transmitting recurrent pulses of acoustical energy, each of the same intensity, through said formation, measuring the amplitude of energy so transmitted through said formation, transmitting recurrent pulses of acoustical energy, each of the same intensity, through a material having the same composition as said formation, measuring under like conditions the amplitude of energy so transmitted through said material, and comparing the first mentioned amplitude with the amplitude of energy so transmitted through said material having the same composition as said formation to establish the degree of fracture of said formation.

8. A method as set forth in claim 7 including the steps of providing a casing in said bore hole and perforating said casing in a region established by said degree of fracture.

9. In the process of completing bore holes in formations for extraction of underground products in which a bore hole is cased by casing, the steps comprising, transmitting recurrent pulses of acoustical energy, each of the same intensity, through said formations, measuring the amplitude of energy so transmitted through said formations under like conditions at different spaced regions in said formations, and perforating said casing at that region where said amplitude is of minimum value.

References Cited by the Examiner

UNITED STATES PATENTS

| | | |
|---|---|---|
| 2,191,120 | 2/40 | Slichter. |
| 2,200,476 | 5/40 | Mounce _____ 166—4 |
| 2,231,243 | 2/41 | Beers _____ 166—4 |
| 2,233,992 | 3/41 | Wyckoff. |
| 2,309,835 | 2/43 | Fearon _____ 166—4 X |
| 2,691,422 | 10/54 | Summers et al. |
| 2,794,512 | 6/57 | Martin. |
| 2,842,852 | 7/58 | Tanguy _____ 166—4 X |
| 3,050,150 | 8/62 | Tixier. |

BENJAMIN HERSH, *Primary Examiner.*